US011182356B2

(12) United States Patent
Barber et al.

(10) Patent No.: US 11,182,356 B2
(45) Date of Patent: Nov. 23, 2021

(54) INDEXING FOR EVOLVING LARGE-SCALE DATASETS IN MULTI-MASTER HYBRID TRANSACTIONAL AND ANALYTICAL PROCESSING SYSTEMS

(71) Applicant: INTERNATIONAL BUSINESS MACHINES CORPORATION, Armonk, NY (US)

(72) Inventors: Ronald J. Barber, San Jose, CA (US); Vijayshankar Raman, Cupertino, CA (US); Richard Sidle, Ottawa (CA); Yuanyuan Tian, San Jose, CA (US); Pinar Tozun, San Jose, CA (US); Chen Luo, Irvine, CA (US); Adam J. Storm, Ontario (CA); Ronen Grosman, Ontario (CA); Matthew J. Spilchen, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 16/420,394

(22) Filed: May 23, 2019

(65) Prior Publication Data
US 2020/0372004 A1 Nov. 26, 2020

(51) Int. Cl.
*G06F 16/00* (2019.01)
*G06F 16/21* (2019.01)
(Continued)

(52) U.S. Cl.
CPC .............. *G06F 16/213* (2019.01); *G06F 7/08* (2013.01); *G06F 16/221* (2019.01); *G06F 16/2255* (2019.01)

(58) Field of Classification Search
None
See application file for complete search history.

(56) References Cited

U.S. PATENT DOCUMENTS 9,767,149 B2    9/2017   Ozcan et al.
9,772,911 B2    9/2017   Barber et al.
(Continued)

FOREIGN PATENT DOCUMENTS

CN         107943927 A     4/2018

OTHER PUBLICATIONS

A Cloud Data Storage System for Supporting Both OLTP and OLAP, Cao et al.,, IEEE (Year: 2011).*
(Continued)

*Primary Examiner* — Jean M Corrielus
(74) *Attorney, Agent, or Firm* — Cantor Colburn LLP; Stosch Sabo

(57) ABSTRACT

According to one or more embodiments of the present invention, a computer-implemented method includes creating a hybrid index for a multi-zone data storage system in which a first zone has data that is organized for transaction processing, and a second zone that has data organized for analytic processing. Each index entry in the hybrid index includes an index key including an equality column, a begin-timestamp column, and a tuple-sequence-number column. The method further includes building an index run to be included in the hybrid index, the index run includes multiple index entries. An index run is created by selecting columns by scanning data blocks from the first zone, computing tuple-sequence-number values for the index entries to be included in the hybrid index, and sorting the index entries according to a predetermined order using the columns to be included in the index run.

25 Claims, 17 Drawing Sheets

(51) Int. Cl.
*G06F 7/08* (2006.01)
*G06F 16/22* (2019.01)

(56) References Cited

U.S. PATENT DOCUMENTS

| | | | | |
|---|---|---|---|---|
| 10,430,100 | B2* | 10/2019 | Barber | G06F 3/0604 |
| 10,664,462 | B2* | 5/2020 | Gurajada | G06F 16/2255 |
| 2014/0279839 | A1 | 9/2014 | Balzar et al. | |
| 2015/0324408 | A1* | 11/2015 | Lee | G06F 16/285 |
| | | | | 707/737 |
| 2016/0283538 | A1 | 9/2016 | Barber et al. | |
| 2017/0277711 | A1* | 9/2017 | Therrien | G06F 16/1748 |
| 2017/0329482 | A1* | 11/2017 | Kumar | H04N 21/485 |
| 2018/0253467 | A1* | 9/2018 | Gurajada | G06F 16/2255 |

OTHER PUBLICATIONS

Hybrid Transactional and Analytical Processing Databases: A Systematic Literature Review, Hieber et al., (Year: 2020).*

ES2—A cloud data storage system for supporting both OLTP and OLAP, Chen et al., IEEE (Year: 2011).*

Notification of Transmittal of The International Search Report and The Written Opinion of The International Searching Authority, or The Declaration issued in International Application No. PCT/IB2020/054619 dated Aug. 31, 2020; 8 pages.

Christian Riegger, Tobias Vinon, and Ilia Petrov, "Multi-version indexing and modem hardware technologies: a survey of present indexing approaches," iiWAS '17 Proceedings of the 19th International Conference on Information Integration and Web-based Applications & Services, pp. 266-275.

David Schwalb, Martin Faust, Johannes Wust, Martin Grund, and Hasso Plattner, "Efficient transaction processing for Hyrise in mixed workload environments," In Memory Data Management and Analysis, pp. 112-125. Springer, Cham, 2015.

Malgorzata Bach, and Aleksandra Werner, "Hybrid column/row-oriented DBMS," In Man-Machine Interactions 4, pp. 697-707. Springer, Cham, 2016.

P. J. Varman, and R. M. Verma, "An efficient multiversion access structure," IEEE Transactions on Knowledge and Data Engineering, Year: 1997, vol. 9, Issue: 3, pp. 391-409.

P. M. Bober, and M. J. Carey, "Indexing for multiversion locking: alternatives and performance evaluation," IEEE Transactions on Knowledge and Data Engineering, Year: 1997, vol. 9, Issue: 1, pp. 68-84.

Fatma Ozcan, Yuanyuan Tian, Pinar Tozun, "Hybrid Transactional/Analytical Processing: A Survey," SIGMOD '17, May 14-19, 2017. DOI: http://dx.doi.org/10.1145/3035918.3054784. pp. 1771-1775.

* cited by examiner

1: Runs ← Assigned Runs
2: Level ← Assigned Level
3: GARBAGECOLLECT(Runs)
4: if CurrentPurgeLevel=Level then
5:   if Cache is Full then
6:     PURGE(Runs)
7:   else
8:     LOAD(Runs)
9: if Runs.size≥Max Runs in Each Level then
10:   MERGE(Runs)

FIG. 15

1: function RECOVERRUNLIST(maxID, minID)
2:    list ← new List
3:    while maxID ≥ minID do
4:       run ← run in highest level with endBlockID = maxID
5:       add run to list
6:       maxID ← run.startBlockID - 1
   return list

FIG. 16

INDEXING FOR EVOLVING LARGE-SCALE DATASETS IN MULTI-MASTER HYBRID TRANSACTIONAL AND ANALYTICAL PROCESSING SYSTEMS

BACKGROUND

The present invention generally relates to computer technology, and more specifically, to indexing for evolving large-scale datasets in a multi-master hybrid transactional/analytical processing system.

The popularity of real-time analytics, e.g., risk analysis, online recommendations, and fraud detection etc., demand data management systems to handle both fast concurrent transactions (e.g. Online Transaction Processing, or OLTP) and large-scale analytical queries (e.g. Online Analytical Processing, or OLAP) over fresh data. OLTP applications facilitate ingesting data at high-speed, persist them into disks or shared storage, and OLAP applications facilitate running analytical queries simultaneously over newly ingested data to derive insights promptly. The necessity of real-time analytics has prompted the emergence of Hybrid Transactional and Analytical Processing (HTAP) systems. HTAP systems support both OLTP and OLAP queries in a single system, thus allowing real-time analytics over freshly ingested data. Fine-grained indexing is mandatory in HTAP systems to support efficient point lookups and range queries for high-speed transactional processing and real-time analytics.

SUMMARY

According to one or more embodiments of the present invention, a computer-implemented method includes creating a hybrid index for a multi-zone data storage system in which a first zone for data that is organized for transaction processing, and a second zone for data that is organized for analytic processing. Each index entry in the hybrid index includes at least an index key that further includes an equality column. The index entry further includes a begin-timestamp column that indicates a timestamp for when the data corresponding to the index entry is inserted. The index entry further includes a tuple-sequence-number column that indicates location of the index entry in a hierarchical storage. The method further includes building an index run to be included in the hybrid index. The index run includes multiple index entries. Building the index run includes determining columns to create in the index run by scanning the data blocks from the first zone, the data blocks to be associated with the index run. Building the index run further includes computing tuple-sequence-number values for the index entries to be included in the hybrid index. The tuple-sequence-number values are stored in the tuple-sequence-number column. Building the index run further includes sorting the index entries according to a predetermined order using the columns to be included in the index run.

In one or more examples, building the index run further includes creating a header for the index run, and setting value of the index run pointer to point to the header. The header includes a pointer that is set to a present value of an index run pointer. In one or more examples, a synopsis of data elements stored within the index run are stored within the header. Further, in one or more examples, building the index run includes computing an offset array for the index run. The offset array can be stored in the header. The offset array maps most significant n bits of the hash values to an offset of the index entry in the index run.

In one or more examples, the index entry further includes a sort column in the index key.

In one or more examples, each index run is assigned a level number, wherein the level number indicates the source of data used to construct the index run. In one or more examples, the level number further indicates a zone in which the data associated with the index run is stored in, the zone being one from the multiple zones in the multi-zone data storage system. In one or more examples, a separate thread is assigned for maintaining one or more index runs from each level.

Further, according to one or more embodiments of the present invention, a computer-implemented method includes, in response to receipt of a request to merge two index runs, a first index run and a second index run, in a database in which data is stored using a hierarchical data storage, creating a third index run to include columns from the first index run and from the second index run. The method further includes sorting, globally, the columns from the first index run and the columns from the second index run using a merge sort. The method further includes based on a determination that the third index run belongs to a non-persisted level, storing the third index run only to a cache storage. The method further includes based on a determination that the third index run belongs to a persisted level, and a level number of the third index run is below a purge level, storing the third index run to the cache storage and to a shared storage. The method further includes based on a determination that the third index run belongs to a persisted level, and the level number of the third index run is equal to or above the purge level, storing the third index run only to the shared storage.

In one or more examples, the method further includes updating a list of index runs in the database. Updating the list includes changing a pointer of a fourth index run that points to an address of the first index run, the pointer changed to an address of the third index run, and deleting the first index run and the second index run. Further, in one or more examples, the first index run and the second index run are deleted after the first index run and the second index run are merged into an index run that belongs to the persisted level.

The above described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 15 provides a pseudo-code for the index maintenance operations according to one or more embodiments of the present invention;

FIG. 16 depicts pseudo code of recovering a run list according to one or more embodiments of the present invention.

Figure 1:
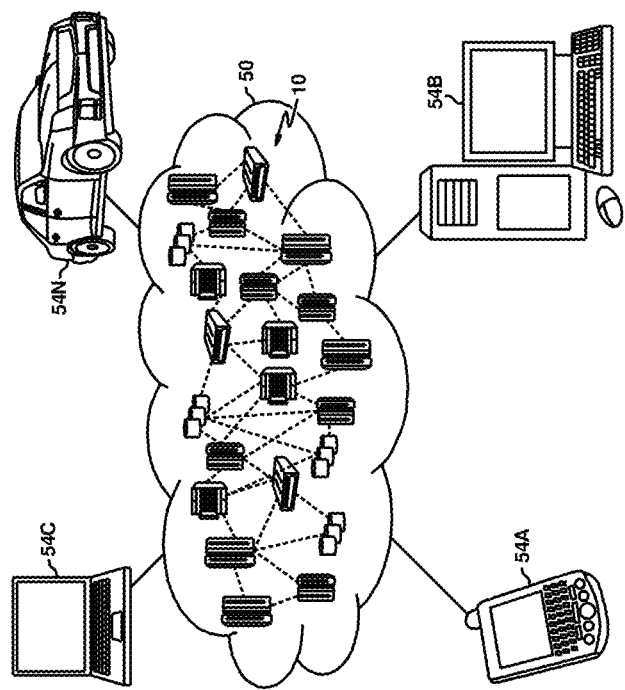
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As described before, HTAP systems support both OLTP and OLAP queries in a single system, thus allowing real-time analytics over freshly ingested data. Fine-grained indexing is mandatory in HTAP systems to support efficient point lookups and range queries for high-speed transactional processing and real-time analytics. However, indexing large volumes of data in HTAP systems is highly non-trivial due to at least the challenges faced with shared storage and data evolution.

First of all, for large-scale HTAP, memory-only solutions are not enough, at least because of limitations on preventing an interference of analytical queries over operational workload. As a result, most HTAP systems persist data in high-available fault-tolerant shared storage, including distributed file system. However, most of these shared storage options are not good at random access and in-place update. For example, HDFS only supports append-only operations and optimizes for block-level transfers, and object storage allows no random access inside an object and no update to an object at all. To accommodate the unique characteristics of shared storage, index operations, e.g., insert, update and delete, have to use sequential I/Os without in-place updates.

Furthermore, accessing remote shared storage through networks for index lookups is costly, e.g. for accessing object storage through REST APIs over HTTP. As a result, indexing methods on HTAP must fully exploit the storage hierarchy in a distributed cluster environment for caching. Particularly, existing solutions can take advantage of large memories and solid state drives (SSDs) in modern hardware. Due to the large scale of data in HTAP systems, however, only the most frequently accessed portions of indexes can be cached locally, while leaving cold entries in shared storage. Effective caching mechanisms have to be developed to facilitate index lookup.

Further, with regards to the data evolution, because HTAP systems have to support both transactional and analytical workloads efficiently, typically the data is stored in different organizations, typically one organization good for transactions on the more recent data and one organization good for analytics on the older data. Here an "organization" refers to a section of stored data, the section determined based on time. Each section may be stored using different data structures. Such "organizations" are used because as the data gets older, it is processed and stored based on results of the processing. For example, transactional data from the latest second (or any other duration) may not yet be analyzed completely for analytical queries, however, as it is analyzed and stored it is organized for performing such analytical queries. The present document refers to these temporally separated data as different "zones" of data. As data age in the system, they evolve from the transaction-friendly zone to the analytics-friendly zone. Evolving the data from one zone to another can include reorganizing the data according to schemas associated with different zones of data. In one or more examples, different zones of data can be stored in different types of storage devices, such as RAM, SSD, and the like.

Such zones can be implemented in various ways. For example, in one or more embodiments of the present invention loosely-coupled HTAP solutions employ non-relational stores for operational workloads, and periodically copy data from the non-relational stores into files in columnar format on the shared storage, so that distributed database engines can efficiently query them. In one or more examples, the data is organized into a read-optimized main store and a write-optimized delta store. Writes are first buffered into the row-major delta store, which is further transformed into the columnar main store to facilitate analytical queries.

In one or more example systems using HTAP, transactions first append writes into a transaction log, which is then groomed into columnar data blocks. The groomed data is further periodically post-groomed to an analytics-friendly organization by creating data versions and data partitioning that are optimal for queries. The data evolution across different zones in these HTAP systems is constantly on-going, posing a significant challenge to building and maintaining indexes.

Existing indexing solutions on multi-zone HTAP systems either support index on the transaction-friendly zone only and the loosely coupled HTAP solutions, or support separate indexes on different zones.

Accordingly, to address such technical challenges, one or more embodiments of the present invention provide a multi-version and multi-zone log-structured-merged-like (LSM-like) index. Such indexing facilitates to efficiently query historical data, such as for real-time analytics, especially for analytical queries that are part of a transaction in the true HTAP scenario. As a result, historical data needs are covered by such indexes. Further, having separate indexes on different zones, exposes a divided view of data, requiring extra work to combine index query results that span multiple zones. In particular, with the constantly evolving nature of HTAP data, it has to be ensured that there is no duplicate or missing data in the final results. The indexing described by the one or more embodiments of the present invention herein provide a consistent and unified index across the different zones in an HTAP system.

One or more embodiments of the present invention are described herein in the context of a large-scale HTAP system which leverages complex analytics and columnar data processing to enable fast transactions and analytics concurrently. However, it is understood that one or more embodiments of the present invention are not limited to such an implementation and that the features described herein are applicable in other contexts using different types of HTAP systems and data processing as well.

A brief description of background technology now follows, after which, particular features of the hybrid indexing used by one or more embodiments of the present invention are described. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
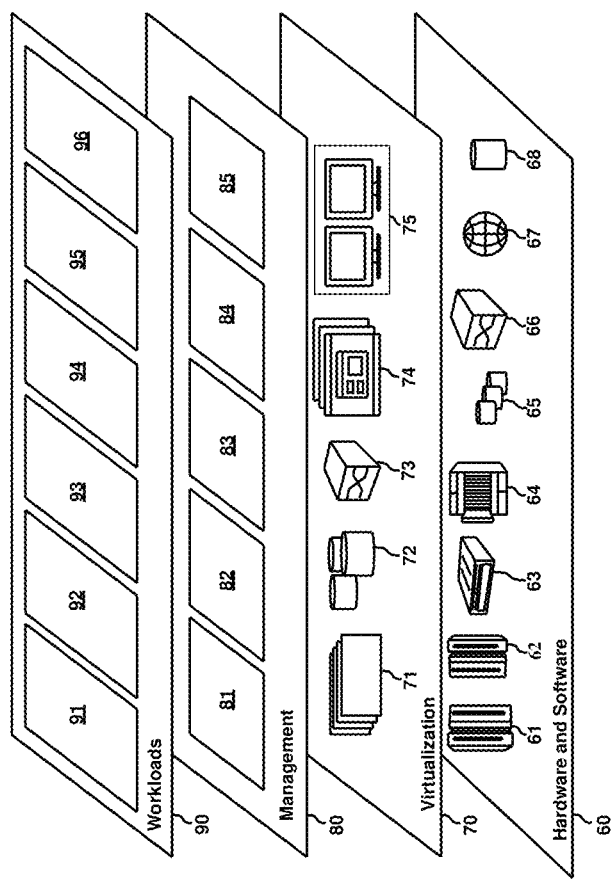
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source-code versioning 96. It is understood that these are just some examples and that in other embodiments, the layers can include different services.

In one or more examples, an HTAP system may be implemented as a multi-master HTAP system with several loosely-coupled processes. Further, in one or more examples, high-speed transactions are supported with a weak form of snapshot isolation and concurrent analytical queries over fresh data, for example using application programming interfaces to that effect.

Figure 3:
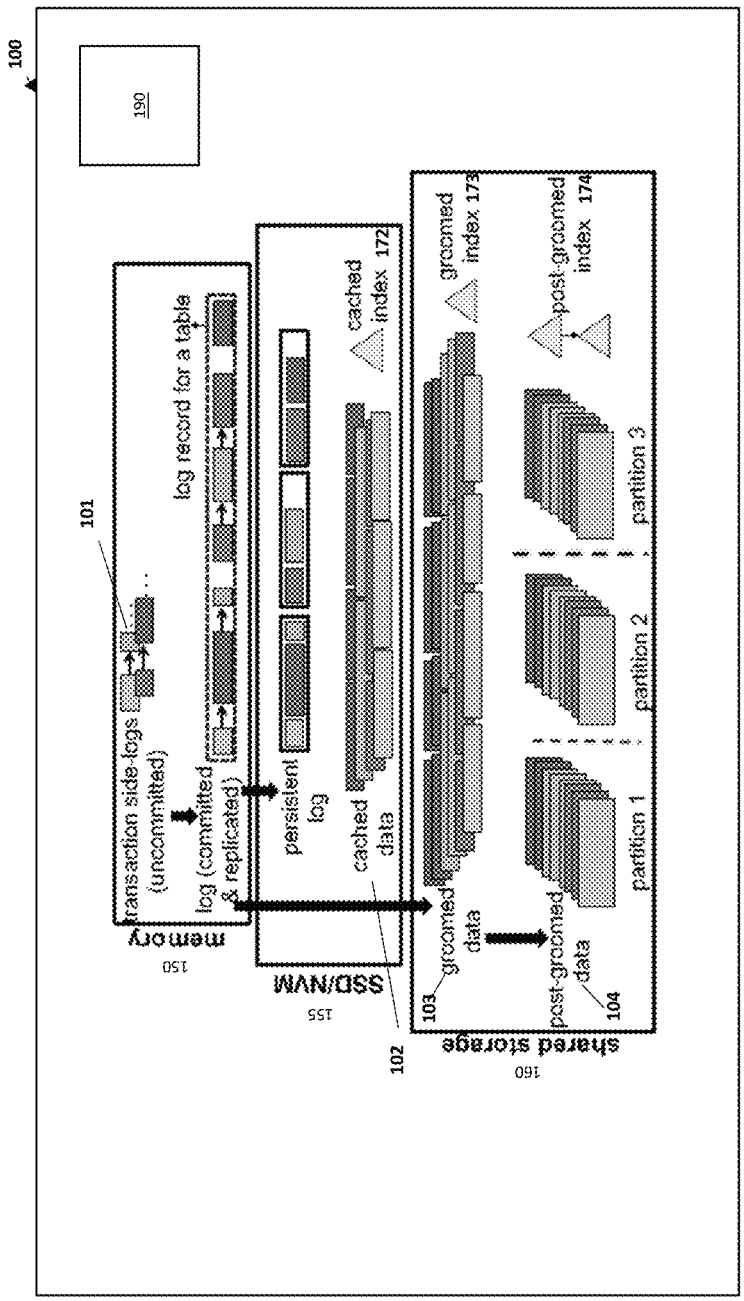
FIG. 3 depicts a data life cycle in an HTAP based system.

FIG. 3 depicts a data life cycle in an HTAP based system. As can be seen, and as described further, data evolves across multiple zones in the system 100, which is an HTAP system.

The system 100 includes a processing unit 190 that can include multiple processors. In one or more examples, the multiple processors are part of different computer servers of a distributed computing system. The computer servers are also referred to as "nodes". The system 100 also includes various types of non-transitory memory devices. The memory usage by the processing unit 190 varies according to the type of the memory device.

A table in the system 100 can be "sharded" using a user-provided sharding key (as a subset of the primary key). In database computing, "sharding" is a technique that facilitates scaling a database by segmenting the data across multiple databases. A table shard is replicated into multiple nodes, where one replica serves as the shard-leader while the rest are slaves. Inserted records are routed by the sharding keys to different shards. Any replica of a shard can ingest data.

As part of ingestion of the data, transactions first append writes into the in-memory transaction log buffer 101. Each shard in the system 100 has a designated groomer, which runs on the leader replica. The groomer is a process that is executed by one or more of the processors in the processing unit 190, particularly those assigned to the leader replica.

The groomer periodically (e.g., every second, every 5 seconds, etc.) merges, in the time order, transaction logs from the transaction log buffer 101 from shard replicas, sets the monotonic increasing begin timestamp (beginTS) for each record, and creates a columnar-format data file, also called a block, in the shared storage 160 as well as the local cache 155. The shared storage 160 is generally slower (higher latency) to access motivating the use of the local cache 155. For example, the shared storage 160 can be hard disk drives, magnetic tape, distributed file systems, cloud storage, and the like, while the local cache 155 can be solid state drives, non-volatile memory (NVM) devices and the like. The local cache 155 is made non-volatile so that the cached component 172 of the hybrid index generated by one or more embodiments of the present invention can be persisted. The hybrid index is a combination of a groomed index 173 and a post-groomed index 174, with the cached component 172 being the part of the hybrid index that is cached in the local cache 155. The various advantages of persisting the cached component 172 include the cached component 172 being readily available for the system 100 to use if/when the system 100 experiences a failure and has to restart. By persisting the cached component 172 in this manner, the indexing process does not have to be executed again.

Each groomed block is uniquely identified by a monotonic increasing ID called groomed block ID. The commit time of transactions in the system 100 is effectively postponed to the groom time. Another separate process, called post-groomer, periodically (e.g., every 10 minutes, 15 minutes, 30 minutes etc.) performs post-groom operations over newly groomed blocks that are in the groomed zone (103) to make data more analytics-friendly, and moving and transforming data from the groomed zone (103) to the organized (or post-groomed) zone (104). The post-groom operation performs a series of tasks over newly groomed data from the groomed zone (103), such as setting end timestamps of updated records for versioning, partitioning data based on the user-defined partition key that are optimized for queries (usually different from the sharding key), and separating latest versions from historical versions to facilitate queries over the latest data. The post-groom operation publishes a file list, which includes a monotonic increasing post-groom sequence number, the ID range of groomed blocks from the groomed zone (103) evolved in this operation, and the list of generated blocks in the post-groomed zone (104). The system 100 organizes data in separate groomed zone (103) and post-groomed zone (104) to support fast ingestion into the groomed zone (103). Meanwhile, the data in the groomed zone (103) is optimized for analytical queries by the post-groomer in the background using an optimization strategy which delays the optimization of a portion of data until that portion is needed to avoid using computing resources for optimizing data that is not being used.

Depending on the freshness requirement, a query may need to access data in the post-groomed zone (104) and groomed zone (103) together. However, data in the transaction log buffer (101) is not accessed by queries because it contains uncommitted data. To facilitate point lookups and transactional processing, our goal is to build index over data in both the groomed zone (103) and post-groomed zone (104) as shown in FIG. 1.

The hybrid index, accordingly, provides a unified view to queries as data continuously evolves from one zone to another in the background. As the data evolves from the groomed zone (103) to the post-groomed zone (104), the hybrid index is also updated by updating the groomed index 173 and the post-groomed index 174. The hybrid index (combination of blocks 172, 173, 174 in FIG. 3) is based on a log-structured merged tree (LSM-tree).

As background on LSM-tree: the LSM-tree is a persistent index structure optimized for high-volume ingestion. Instead of updating entries in place, which potentially requires a random I/O, the LSM-tree batches inserts into memory and flushes the data to disk using sequential I/O when the memory is full. Each flush operation creates a new run. LSM-tree runs are immutable. Modifications (inserts, updates and deletes) are handled by inserting new entries into the memory. An insert or update simply inserts a new entry with the same key, while a delete places a tombstone entry indicating that key has been deleted. A query has to reconcile entries with identical keys from multiple runs, where entries from newer (i.e., more recent) runs override ones from older runs. A "run" as used herein can be structured in various ways, such as using a B-tree, a sorted array with a list of page pointers stored in memory to guide the search, or any other such data structure.

In order to keep the number of runs small, which improves query performance, runs are periodically merged into larger ones. In general, merge processes that are commonly used in practice include leveling and tiering. There are discussed below in brief, however, it is understood that any other merge process can be used in one or more embodiments of the present invention. In the leveling and tiering scheme, runs are organized into levels, where a new run is added into the lowest level 0, and runs are merged into higher levels gradually. The leveling policy optimizes for index lookups by limiting only one run in each level. The run in level L is immediately merged with the run in level L+1. However, the tiering policy allows at most N runs in level L, and these runs are merged together into a new run in level L+1, reducing the amortized insert cost at the expense of lookup cost.

Although LSM-like indexing has been used in existing technology, the technical challenge of indexing with multi-level storage hierarchies and evolving of data has not been addressed, which is being done by one or more embodiments of the present invention.

Figure 4:
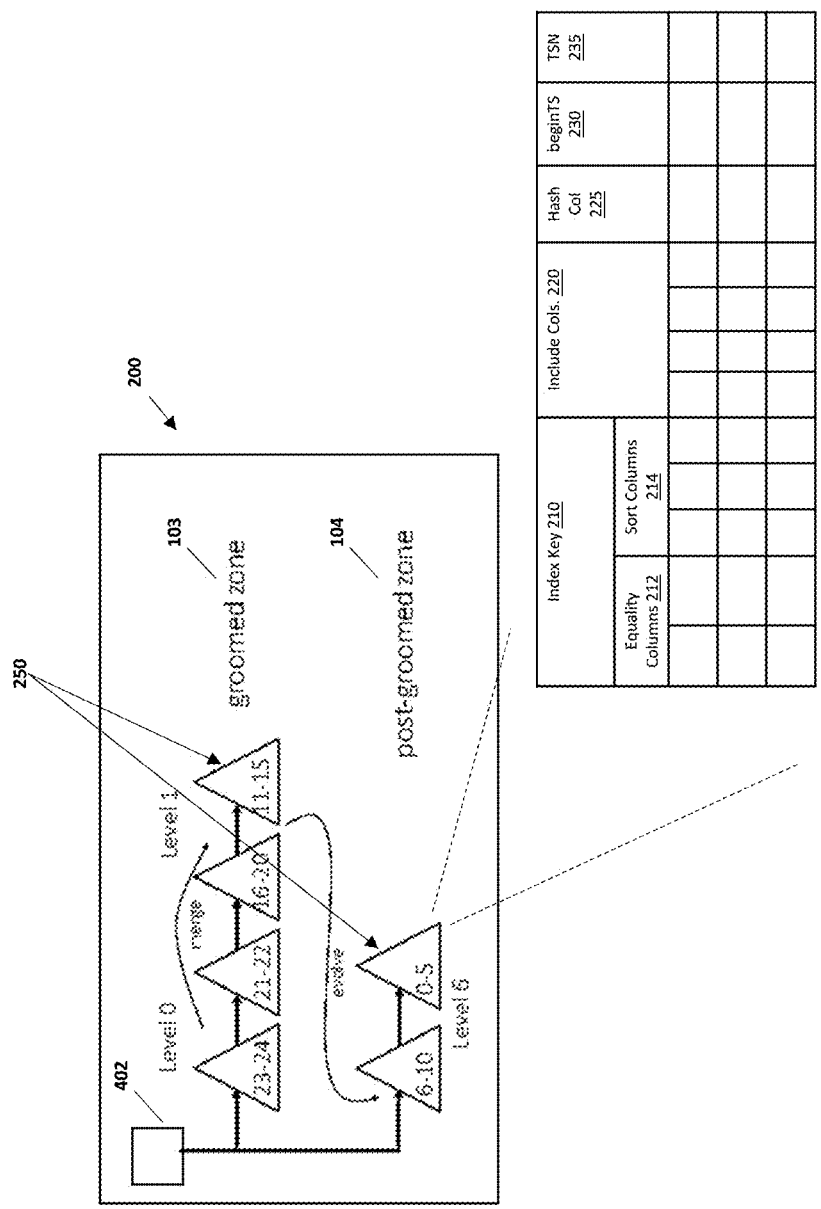
FIG. 4 depicts a representative view of a hybrid index according to one or more embodiments of the present invention.

FIG. 4 depicts a representative view of a hybrid index according to one or more embodiments of the present invention. The hybrid index 200 is an LSM-like index with runs 250 organized into levels across multiple zones (103, 104). The hybrid index 200 also includes a header block 402 that includes metadata for the hybrid index 200, such as a synopsis of the data included in the hybrid index 200. Further, the index runs 250 are organized into levels (e.g., level 0 to 5). It should be noted that in one or more examples, each level may not be present depending on the age of the data. For example, in FIG. 4, the data is organized into level 0, level 1, and level 6. In other examples, the index runs 250 may be organized into different number of levels (e.g. 0-4 levels), and/or into different levels (levels 0, 1, 2, and 3). A data ingest creates a new index run 250. Each index run 250 has a list of sorted rows (i.e., index entries). As is described further, the hybrid index 200 is maintained using background index maintenance operations that are non-blocking to readers. The index maintenance operations include a merge operation that produces a new index run 250 in the next level, an index purge and garbage collection for space management, and an index evolve operation that is to be executed after data evolves or gets updated from one zone to another.

The hybrid index 200 can be used in a single-run format (250) and in a multi-run structure respectively, as will be described herein. Here, an index run 250 (represented by a triangle) is an indexed file containing the indexed entries for data from a group of groomed blocks. The block ID range is marked in each index run (depicted as a triangle in FIG. 4).

As shown in FIG. 4, the hybrid index 200 can include multiple runs 250, where level 0 to 5 (levels 2-5 not shown) are configured for the groomed zone 103, while level 6 to 9 (levels 7-9 not shown) are configured for the post-groomed zone 104. For clarity, each run 250 is labeled with the range of groomed block IDs it corresponds to. In the illustrated example, groomed runs labeled 23-24 and 21-22 belong to level 0, while runs labeled 16-20 and 11-15 belong to level 1. Post-groomed runs labeled 6-10 and 0-5 belong to level 6.

An index run 250 includes an index key and zero or more include columns 220. The index key 210 is defined as a composite key with zero or more equality columns 212 (used for equality predicates) and zero or more sort columns 214 (used for range predicates). The include columns 220 are columns which are included in the index run 250 to facilitate query processing by enabling index-only access. The hybrid index 200 includes at least one equality column 212 or a sort column 214 to be specified in the index key 210.

If the equality column(s) 212 is specified, a hash value of the equality column values is also stored in the index run 250 to speed-up index queries. The index run 250 is, in this manner, a combination of hash and range index. In an example Internet of Things (IoT) application, a device ID is made the equality column 212, while the message number (msg) is made a sort column 214. As a special case, the equality column(s) 212 is left out, which makes the hybrid index 200 a range index. In the above example, the record that is being ingested can include at least the device ID, the msg, and a message, among other data elements.

In one or more examples, the index key is the primary key of a table, i.e., the hybrid index 200 is a primary index.

An index run can be logically viewed as a table of rows. In addition to columns specified in the index definition above, the table contains two extra columns: beginTS column 230 and tuple sequence number (TSN) column 235. The beginTS column 230 indicates the timestamp when the record is being inserted. The beginTS in the system 100 is generated by the groom operation. The TSN column 235 specifies the exact location of the indexed record. In one or more examples, a TSN in the system 100 can be a 64-bit integer, where the high-order bits indicate the block ID, while the low-order bits specify the record offset within that block.

Accordingly, each row in the index run has a hash column 225, equality columns 212, sort columns 214, beginTS 230, include columns 220, and TSN 235. In one or more examples, the rows in the index run are ordered by the hash column 225, equality columns 212, sort columns 214, and descending order of beginTS 230.

As a special case, if equality columns 212 are not specified, then the hash column 225 is omitted from the index run. The beginTS column 230 in descending order facilitates the access of more recent versions. All ordering columns, i.e., the hash column 225, equality columns 212, sort columns 214 and beginTS 230, are stored in lexicographically comparable formats so that keys can be compared by using memory compare operations when processing index queries.

Physically, an index run is stored as a header block plus one or more fixed-cardinality data blocks (except for the last data block). The header block contains the metadata information of the index run, such as the number of data blocks, the merge level this run belongs to, and the range of groomed block IDs to which this run corresponds.

To prune irrelevant runs during index queries, a synopsis is stored in the header block in one or more embodiments of the present invention. The synopsis contains the range of each key column stored in this run. A run can be skipped by an index query if the input value of some key column does not overlap with the range specified by the synopsis.

When equality columns 212 are specified in the hybrid index 200 definition, the header block includes an offset array of $2^n$ integers to facilitate index queries. The offset array maps the value of the most significant n bits of hash values to the offset in the index run. When processing index queries, the offset array can be used to provide a more compact start and end offset for binary search, effectively limiting the number of blocks to be accessed.

Figure 5:
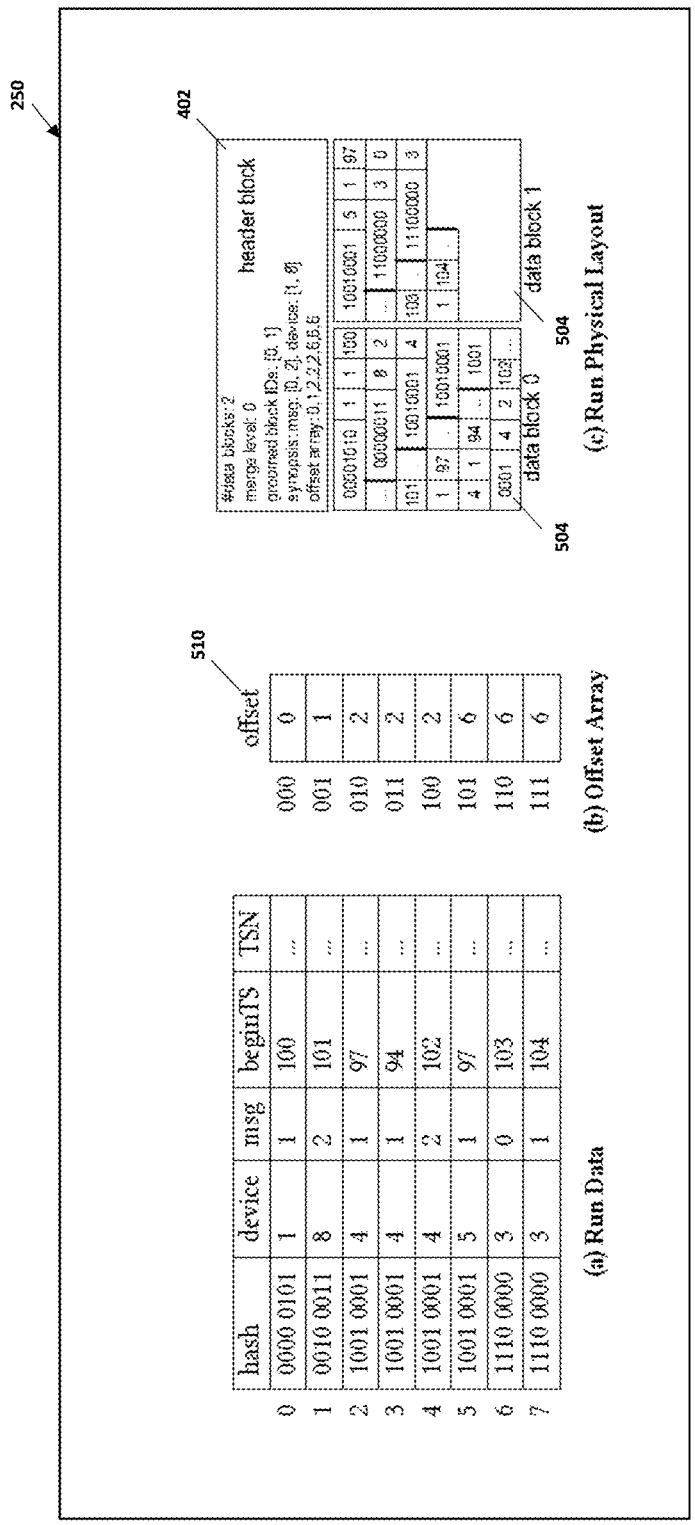
FIG. 5 shows an example index run according to one or more embodiments of the present invention.

FIG. 5 shows an example index run according to one or more embodiments of the present invention. In the example scenario depicted consider that device ID (labeled in FIG. 5 as "device") is the equality column 212 and msg is the sort column 214. For simplicity, other columns in the index run are not shown, and assume the hash value takes only one byte. Table a shows index entries in this run, where the hash value is shown in the binary format, and Table b shows the offset array with the most significant 3 bits of hash values. The physical layout of this index run 250 is shown in Table c, where the index run 250 contains one header block 402 and two data blocks 504.

According to one or more embodiments of the present invention the hybrid index 200 can include multiple runs, which are organized into multiple levels. Runs in lower levels, e.g., level 0, correspond to more recent data, and are periodically merged into higher levels to limit the total number of runs. However, data in HTAP systems is generally organized into multiple zones (103, 104) as described herein, and the data gradually evolves from one zone to another. To account for such multizone data organization in HTAP systems, the hybrid index 200 separates levels into multiple zones accordingly. In one or more examples, the hybrid index 200 contains two zones, one for groomed zone (103) and one for post-groomed zone (104). Within each zone, runs are chained together based on their creation time into a linked-list, where the header 402 points to the most recent run. Runs can only be merged into the same zone.

That is, runs in the groomed zone 103 cannot be merged into a new run in the post-groomed zone 104. Instead, runs periodically evolve to another zone through index evolve operations, as data evolve in the system over time. The detail of index maintenance operations, e.g., merge and evolve, are discussed further herein.

In one or more examples, the user can setup one or more lower levels as non-persisted to avoid writing too many small files to shared storage, because runs in lower levels are typically small and merged frequently. Runs in non-persisted levels only exist in memory 150 and SSD cache 155 but are not persisted in shared storage 160, which can substantially improve the merge performance. However, for recoverability, level 0 has to be set as persisted so that the system does not need to rebuild index runs after system crashes/failures.

Figure 6:
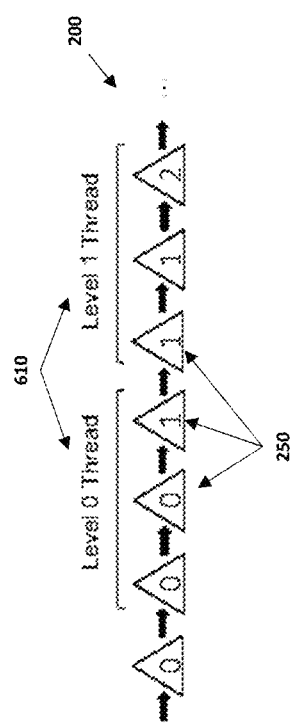
FIG. 6 depicts an example run assignment for index maintenance according to one or more embodiments of the present invention.

FIG. 6 depicts an example run assignment for index maintenance according to one or more embodiments of the present invention. In this illustration, each run 250 is labeled with the level it belongs to. To minimize concurrent index modifications caused by index maintenance, each level is assigned to a dedicated index maintenance thread 610. Each thread 610 periodically performs index maintenance operations only to the runs 250 assigned to that thread 610. This guarantees that an index run 250 can only be modified by one thread 610 at a time, minimizing locking and contentions among concurrent index modifications. Index maintenance operations include index build, purge, merge and evolve operations. The index maintenance is performed concurrently with index queries and other index modifications. To achieve maximum concurrency for index queries, atomic pointer swaps are used instead of locking. All index maintenance operations are such that each index modification, i.e., a pointer swap, results in a valid state of the index. As a result, index queries are non-blocking and lock-free.

Further, as shown in FIG. 6, the assignment of the thread 610 is shifted by one run 250, that is the thread 610 for level L handles all but the first run in level L plus the first run in level L+1.

Figure 7:
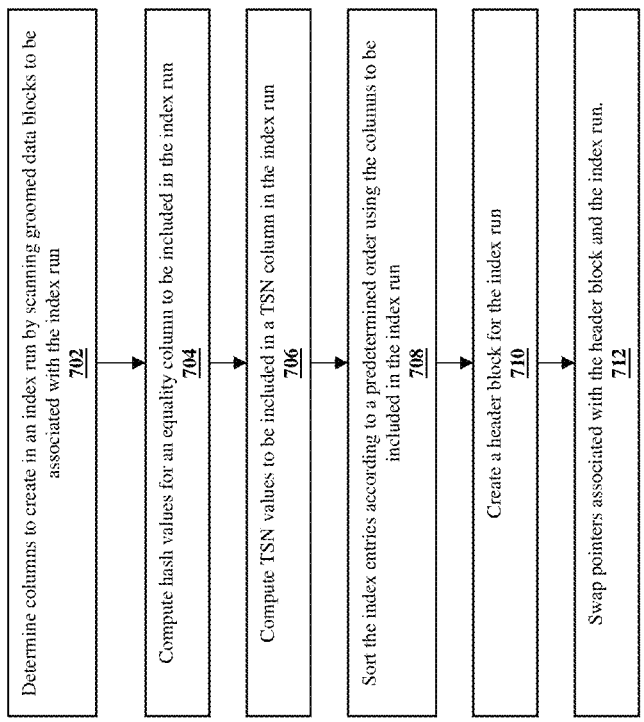
FIG. 7 depicts a flowchart for an example method for building an index run according to one or more embodiments of the present invention.

FIG. 7 depicts a flowchart for an example method for building an index run according to one or more embodiments of the present invention. Index maintenance includes an index build operation that creates a new index run 250 over the data blocks in the groomed zone 103 so that groomed data can be queried from the index. To build the index run 250, the groomed blocks in the groomed zone 103 are scanned to determine which columns, i.e., equality columns 212, sort columns 214, and include columns 220 are to be included in the index run 250, at 702. Further, the TSNs 235 are computed, at 704. Further yet, hash values 225 for equality columns 212 (if any) are computed, at 706.

Further, index entries are sorted in ascending order of hash values 225, sort columns 214, equality columns 212 and descending order of beginTS 230, at 708. Sorted entries are written to index data blocks sequentially, at 708. Further, the offset array 510 is computed substantially simultaneously.

After all entries are written out, the header block 402 is created including writing out the offset array 510 with other necessary fields, at 710. The new index run 250 is added to the groomed run list by setting the new index run 250 to point to the created header 402, and resetting the header 402 as the new index run 250, at 712. Note that the order of pointer swaps is important to guarantee the correctness for concurrent readers.

Figure 8:
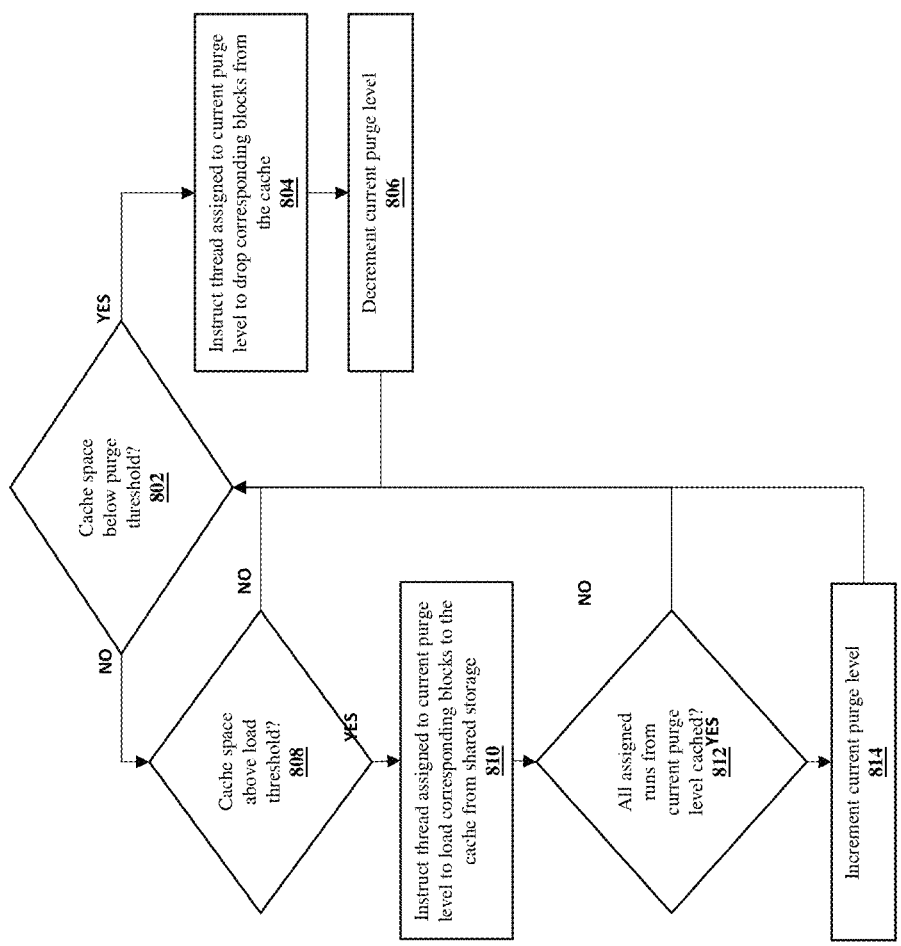
FIG. 8 depicts a flowchart for an example method for purging an index run according to one or more embodiments of the present invention.

FIG. 8 depicts a flowchart for an example method for purging an index run according to one or more embodiments of the present invention. Index maintenance includes an index purge operation that removes some index entries from the cache 155 to free up the cache space. Typically, large-scale HTAP systems include multi-layer storage hierarchies (FIG. 3) with memory 150, cache 155, and shared storage 160. The cache 155, which can be SSD serves as a cache layer for the shared storage 160 to accelerate index queries. In general, the index runs 250 fit into the SSD cache 155 such that shared storage 160 is used for backup. However, when the SSD cache 155 is full, index purge removes some index entries from the SSD cache 155 to free up the cache space. In one or more examples, recent data is assumed to be accessed more frequently. Accordingly, as the index 200 grows, old runs, i.e., runs in high levels, from the SSD cache 155 are purged to free up the cache space.

The index purge operation is handled by index maintenance threads 610 described above in reference to FIG. 6. To ensure that runs are purged in a proper order, i.e., older runs get purged first, a current purge level is tracked. The current purge level separates purged and cached runs. In other words, all runs 250 above the purge level are purged, while below the purge level are cached.

Only the thread for the current purge level is allowed to purge index runs 250. When the SSD cache space is full, this thread 610 associated with the current purge level, purges its assigned runs 250 by dropping data blocks from the SSD cache 155, at 802, 804. If all assigned runs have been purged, the thread 610 decrements the purge level, transferring the ownership to the next lower level thread, 806.

Figure 9:
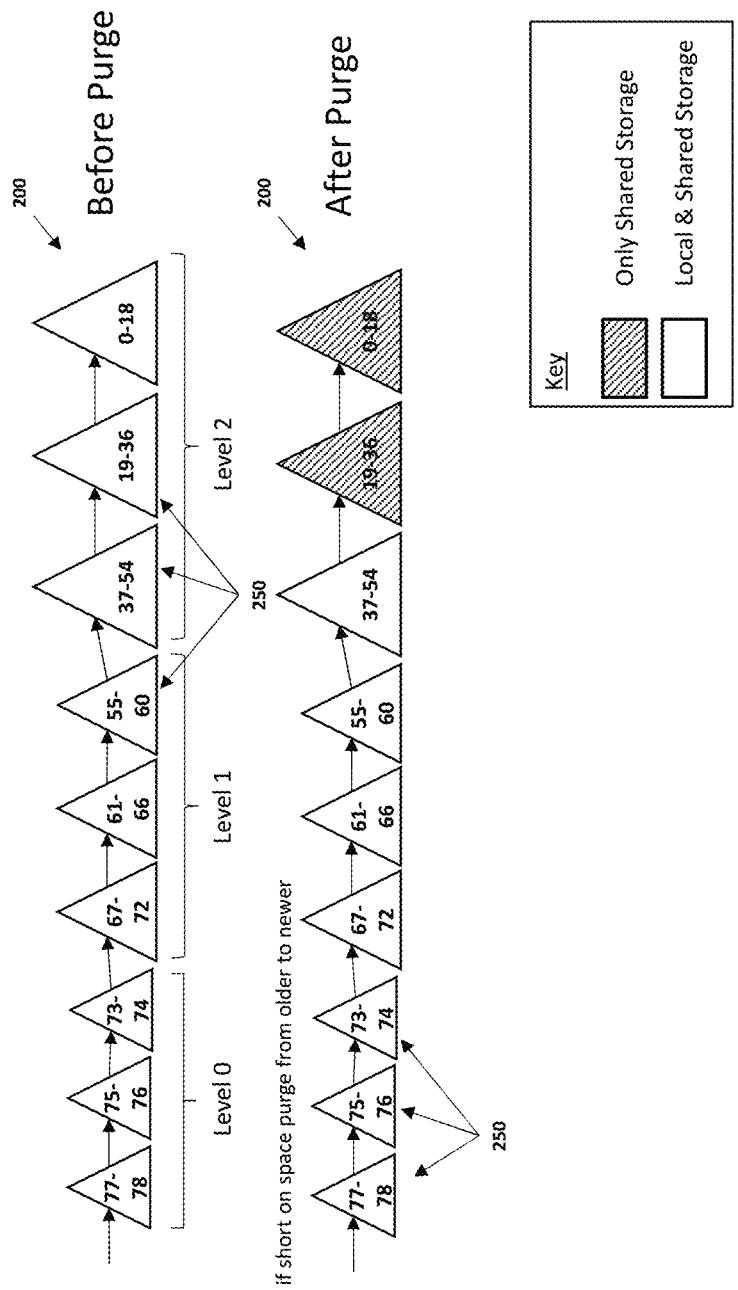
FIG. 9 depicts a visual illustration of the purge operation according to one or more embodiments of the present invention in an example scenario.

FIG. 9 depicts a visual illustration of the purge operation according to one or more embodiments of the present invention in an example scenario. In the depicted scenario, the index runs 250 for the block IDs 0-18 and 19-36 are dropped from the cache 155 and are accordingly only stored in the shared storage 160.

In contrast, if the SSD cache 155 has free space, recent runs 250 are loaded (in the reverse direction of purge) into SSD cache 155 to speed-up index queries, at 808. In the case of load, the thread 610 assigned to the current purge level loads the corresponding runs 250 from the current purge level by caching data blocks from shared storage 160 into the SSD cache 155, 810. Further, the thread 610 increments the purge level when all assigned runs have been cached, transferring the ownership to the next higher level thread, at 812, 814.

The index maintenance operations further include index merge. Index runs 250 are periodically merged to form a larger index run 250 to bound the number of runs 250 and improve the query performance. As noted earlier herein, the merge can be performed using a leveling policy that optimizes for index queries by limiting only one index run 250 in each level. In this case, a first index run 250 in level L is merged with a second index run 250 in the next level (L+1) when the size of the first index run 250 exceeds a predetermined threshold. Accordingly, the first index run 250 is merged multiple times before it fills up and merges into the next level. In contrast, the tiering policy optimizes for write amplification by allowing multiple index runs 250 in each level. In this case, index runs in level L are merged into a new index run in level L+1. One or more embodiments of the present invention balance the trade-off between write amplification and query performance, by using a hybrid merge that combines the leveling and tiering merge techniques. Similar to the tiering policy, we allow multiple index runs 250 in each level. On the other hand, similar to the leveling policy, merging runs in level L does not always create a new run in level L+1. If the first run in level L+1 is not large enough (as a configurable parameter), it is merged together with runs in level L. Otherwise, runs in level L are merged into a new run in level L+1. Thus, an index maintenance thread for level L is responsible for all but the first index run 250 of level L plus the first index run 250 in level L+1, which results in the one-run-shift assignment as shown in FIG. 6.

Figure 10:
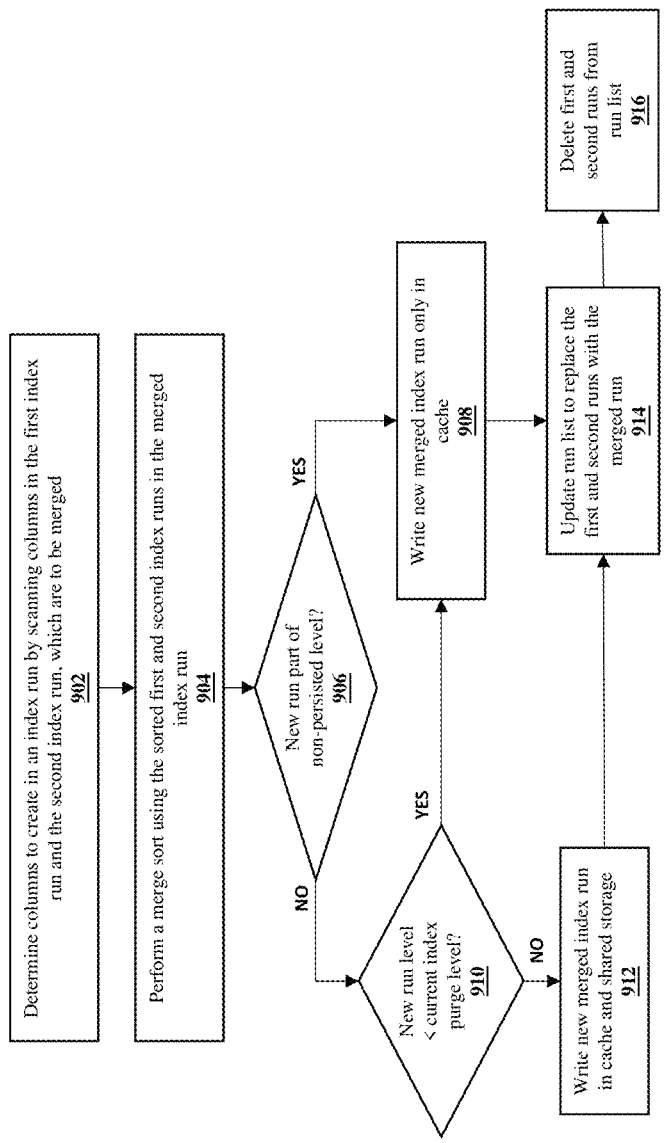
FIG. 10 depicts a flowchart of an example method for an index merge operation according to one or more embodiments of the present invention.

FIG. 10 depicts a flowchart of an example method for an index merge operation according to one or more embodiments of the present invention. Initially, the method includes determining columns to create in the new index run 250, which is the merged index run, by scanning columns in the first index run and the second index run, which are to be merged, at 902. Forming a new index run 250 during the merge operation when compared to creating an index run 250 from groomed blocks in the groomed zone 103, has a difference that entries in each index run being merged are already sorted. Accordingly, in case of the merge a merge sort has to be performed to globally sort the two index runs 250 being merged, at 904.

The write target of the new run depends on the current index purge level and nonpersisted levels of the hybrid index 200. Specifically, if the new run 250 belongs to a non-persisted level, then it is only written to SSD cache 155, at 906, 908. Otherwise, if its merged level is below the current index purge level, the new index run 250 is written to both the SSD cache 155 and the shared storage 160, which alleviates cache misses after index merge, at 906, 910, and 912. Finally, if the new index run 250 is persisted and above the current index purge level, then it is only written to the shared storage 160, at 906, 910, and 908.

The new index run 250 then replaces the merged index runs in the run list. Specifically, the new index run 250 is set to point to the index run 250 that was originally pointed to by the last merged run, and then the index run before the first merged run is set to point to the new index run 250, at 914. A lock over the run list is required to ensure the correctness of run replacement, because two pointers are read and set, which is not an atomic operation, and pointers can be concurrently modified by the next level thread. However, the locking overhead is negligible because it only affects index maintenance operations which happen infrequently, e.g., every second or minute, and these locks do not block any index queries.

Further, the merged runs 250 are deleted when the last reader exits, at 916. However, index runs in the first level before the non-persisted levels cannot be removed immediately after being merged, because otherwise index runs can be lost when the system crashes. Instead, these runs are tracked and deleted only after they have been merged into the first level after the non-persisted levels. For example, suppose non-persisted levels are configured as level 1 to 2; that is, when runs in level 0 are merged into level 1, they cannot be deleted immediately for recoverability. The system keeps track of these runs, and deletes them only if they have been merged into level 3, which is persisted again on shared storage 160.

The index maintenance also includes evolving the index as the data is evolved from blocks in the groomed zone 103 to the blocks in the post-groomed zone 104. As described earlier, the post-groomer periodically moves data blocks in the groomed zone 103 to the post-groomed zone 104, marking them as deprecated and eventually to be deleted. Correspondingly, index entries have to be evolved from the groomed run list to the post-groomed run list as well such that deprecated groomed blocks are no longer referenced. However, index evolving is non-trivial due to at least the following challenges.

First, in one or more HTAP systems, data evolution is handled by separate processes. For example, the postgroomer is a separate process running on a different node from the indexing process. One challenge is thus to minimize the communication and coordination among multiple processes during the index evolve operation. Moreover, the index evolve operation itself applies multiple modifications to the index, e.g., adding a new run to the post-groomed run list and cleaning up old runs in the groomed run list, which poses another challenge to achieve non-blocking for index queries.

Figure 13:
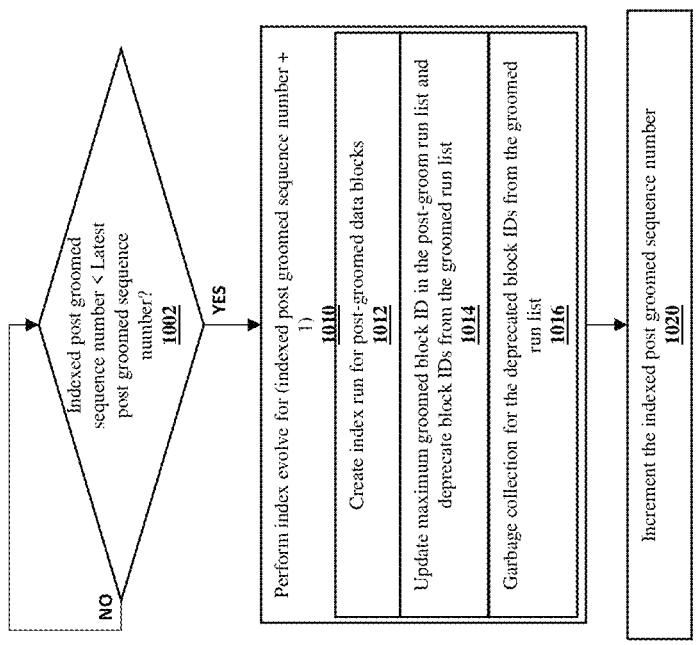
FIG. 13 depicts a flowchart for an example method of performing an index evolve operation according to one or more embodiments of the present invention.

FIG. 13 depicts a flowchart for an example method of performing an index evolve operation according to one or more embodiments of the present invention. To tackle the data evolution being handled by separate processes, the index evolve operation in one or more embodiments of the present invention is performed asynchronously by the indexing process without any coordination. After each post-groom operation, the post-groomer publishes and persists the post groom sequence number (PSN) for this operation. PSN is an increasing sequence number to uniquely identify each run of the post groom procedure. In the meanwhile, the indexing process keeps track of the maximum post groom sequence number which has been indexed, i.e., IndexedPSN, and keeps polling the latest PSN. If IndexedPSN is smaller than PSN, the indexing process performs the index evolve operation for IndexedPSN+1, which guarantees the index evolves in a proper order, and increments IndexedPSN when the operation is finished, at 1002, 1010, and 1020. It should be noted that asynchronous index evolution has no impact on index queries because the post-groom operation only moves data from one zone to another without producing any new data. For a query, it makes no difference to access a record from the groomed zone 103 or the post-groomed zone 104.

For clearing old runs in the groomed run list to achieve non-blocking for index queries, one or more embodiments of the present invention decompose the index evolve operation into a sequence of atomic sub-operations. Each sub-operation is an atomic modification of the index state. It is further guaranteed that any sub-operation results in a correct index state, thus achieving non-blocking and lock-free for index queries. For example, the index evolve operation for a given post-groom sequence number is performed as follows. First, an index run 250 for data blocks produced by this post-groom operation is built, and subsequently added to the post-groomed run list, 1012. It should be noted that the run header block still contains the range of groomed block IDs this run corresponds to. Second, the maximum groomed block ID covered by runs in the post-groomed run list is updated, at 1014. At this moment, all runs in the groomed run list with end groom block ID no greater than this updated value are automatically deprecated and ignored by index queries because entries in these runs have already been covered by the post-groomed list. Finally, the deprecated runs in the groomed run list are garbage collected by each index maintenance thread, at 1016. In one or more examples, the garbage collection is performed once the number of runs in the groomed list cross a predetermined threshold. Before performing other index maintenance operations, the thread first removes deprecated runs from the run list, avoiding concurrent modifications with other index maintenance operations on these runs.

In the above, each step only makes one modification to the hybrid index 200, and is thus atomic. Between any two of the above steps, the hybrid index 200 can contain duplicate entries, i.e., a record with the same version could be indexed by both a groomed run and a post-groomed run. Moreover, even after the last step of the index evolve operation, the hybrid index 200 can still contain duplicates since groomed blocks in the groomed zone 103 consumed by the post-groom operation may not align perfectly with the boundaries of index runs 250. However, duplicates are not harmful to index queries. They are removed on-the-fly during query processing to guarantee that only one version is returned for each matching key, while the rest, including duplicates, are discarded. The details of query processing are described further herein.

Figure 11:
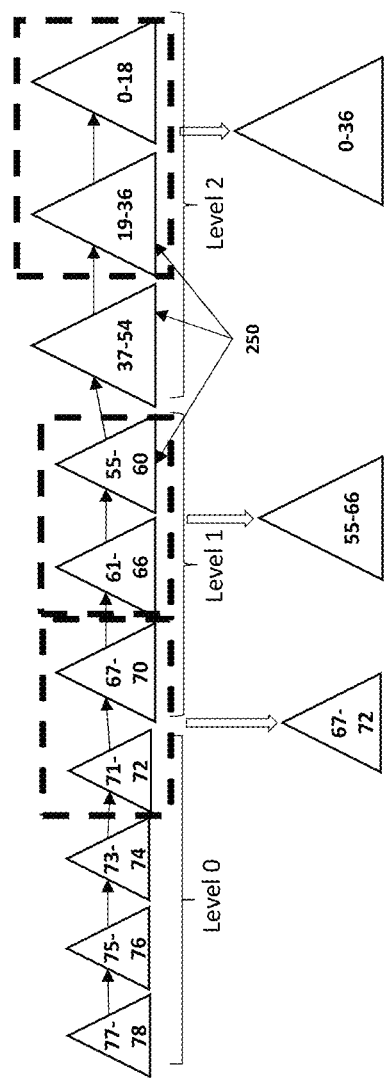
FIG. 11 and FIG. 12 depict a visual illustration of an index merge operation according to one or more embodiments of the present invention in an example scenario.
Figure 12:
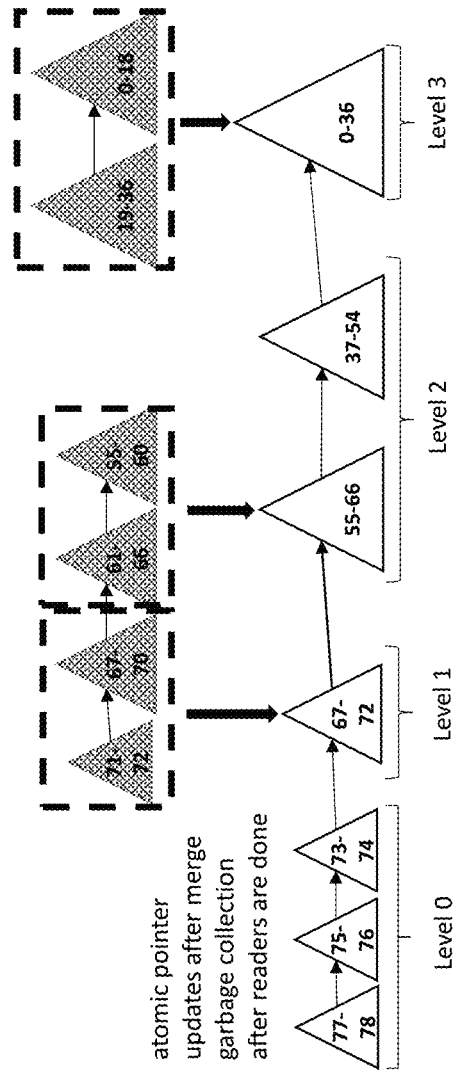

FIG. 11 and FIG. 12 depict a visual illustration of an index merge operation according to one or more embodiments of the present invention in an example scenario. Here the index runs 250 that are merged are those for the block IDs 67-70 and 71-72, block IDs 55-60 and 61-66, and block IDs 0-18 and 19-36. FIG. 11 depicts the creation of the merged index runs 250. FIG. 12 depicts the second phase of the merge operation where the atomic pointer updates are performed after the merged index runs 250 are created. Further, the earlier index runs, which are now merged in the newly created index runs, are garbage collected. As can be seen, the merge operation can be performed in any of the levels, and further, a merged run can be assigned to a different level than the index runs 250 that were merged to create the merged index run.

Figure 14:
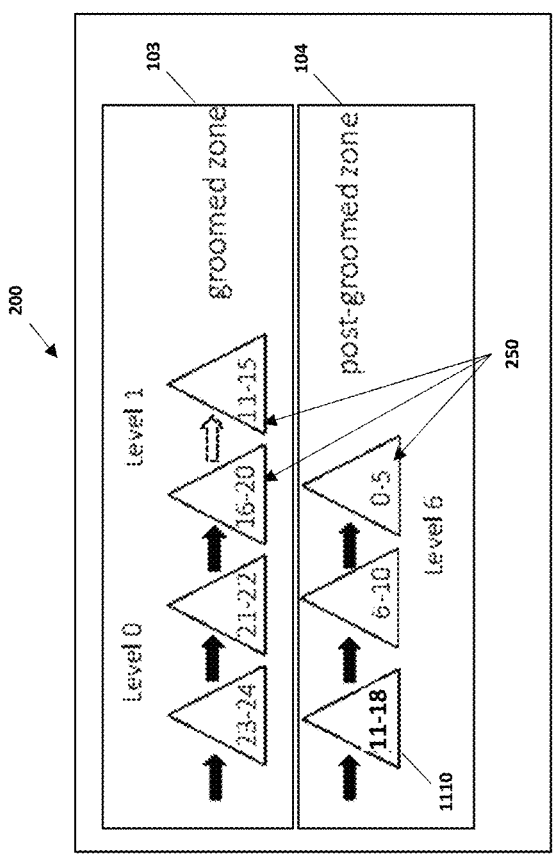
FIG. 14 illustrates an example scenario of evolving an index according to one or more embodiments of the present invention.

FIG. 14 illustrates an example scenario of evolving an index according to one or more embodiments of the present invention. The particular example illustrated shows a result index after groomed blocks 11 to 18 have been post-groomed, where the original index is shown in FIG. 4. Here a new index run 1110 for block IDs 11-18 is created for the newly post-groomed data. Run-1 250 for block IDs 11-15 is ignored by subsequent queries because its entries are fully covered by the new index run 1110. It is further garbage collected by the index maintenance thread 610 when the thread 610 wakes up next time. Further it should be noted that the index run-2 250 for block IDs 16-20 still contains duplicate entries with the new index run 1110. These duplicates are removed during query processing.

FIG. 15 provides a pseudo-code for the index maintenance operations according to one or more embodiments of the present invention. As noted earlier, the index maintenance operations are performed by index maintenance threads 610, each thread assigned to list of index runs 250 from a particular level. The thread 610 first garbage collects the assigned index runs 250, if any of them has evolved to another zone. Subsequently, if the current purge level equals to the assigned level, the thread purges or loads index runs based on the current cache space. Finally, if the number of runs in this level exceeds a pre-defined threshold, the thread 610 merges the assigned index runs 250.

In one or more embodiments of the present invention building new index runs after the groom or post-groom operation is not handled by the index maintenance thread 610. Instead, building a new index run 250 over data in the groomed zone 103 is part of the groom operation, which is handled by the groomer thread. Indexing the data in the post-groomed zone 104 is performed by a dedicated thread of the indexing process, which periodically reads the latest PSN to see whether there is any new post-groom operation performed.

As described herein, the hybrid index 200 according to one or more embodiments of the present invention is a persisted index that facilitates efficient recovery of the system without having to perform indexing again, such as in case of a system failure. This is because, all index runs 250 except those in non-persisted levels are safely persisted in the shared storage 160. After each index run 250 is built and added to the hybrid index 200, the maximum groomed block ID for the groomed/post-groomed run list is updated and persisted. However, the indexing process can crash, losing all data structures in the local node. Therefore, to recover the hybrid index 200, the run lists have to be reconstructed based on the index runs 250 stored in the shared storage 160 and clean up garbage and incomplete runs if any.

FIG. 16 depicts pseudo code of recovering a run list according to one or more embodiments of the present invention. In the illustrated example, function RecoverRunList takes as input the maximum groomed block ID (maxID) and minimum groomed block ID (minID) for that run list. Starting from maxID, the function finds the run in the highest level with end block ID being maxID. The function then searches backward by setting maxID as the start block ID of this run minus one. This process is iterated until maxID is less than minID.

To recover the two run lists, the RecoverRunList function is invoked with proper maxID and minID. For both lists, maxID is set as the corresponding maximum groomed block ID as persisted. However, minID for the groomed run list is set as maximum groomed block ID for the post-groomed run list plus one, because all index entries below it have already been evolved to the post-groomed run list. While minID for the post-groomed run list is simply set as 0, assuming the groomed block ID starts from 0. After the two run lists are recovered, all unused run block files are simply deleted, because they correspond to either a merged or incomplete run.

After run lists have been recovered, the index is ready for processing index queries. If IndexedPSN is less than the current PSN, the index evolve operations are performed asynchronously as discussed before, until IndexedPSN finally catches up.

The hybrid index 200 created and maintained in this manner facilitates processing queries in an efficient manner compared to existing technologies, and as described herein, facilitates a multi-zone queries. Because the hybrid index 200 is a multi-version index, the query has to specify a query timestamp (queryTS), and only the most recent version for each matching key is returned, i.e., the version with largest beginTS 230 such that beginTS≤queryTS.

In general, two types of index queries are supported. First, a range scan query that specifies values for all equality columns 212 (if any) and bounds for the sort columns 214, and returns the most recent version of each matching key. Second, a point lookup query that specifies the entire index key (i.e., the primary key), and at most one matching record is returned.

To process an index query, candidate runs are initially collected by iterating the run lists and checking run synopses. An index run 250 is considered as a candidate only if all column values as specified in the query satisfy column ranges in the synopsis. Also note that all index runs 250 are read from the SSD cache 155. In case a query needs to access purged runs, the index runs are first transferred from the shared storage 160 to the SSD cache 155 on a block-basis, i.e., the entire run data block 402 is transferred at a time, to facilitate future accesses. After the query is finished, the cached data blocks are released, which are further dropped in case of cache replacement.

Figure 17:
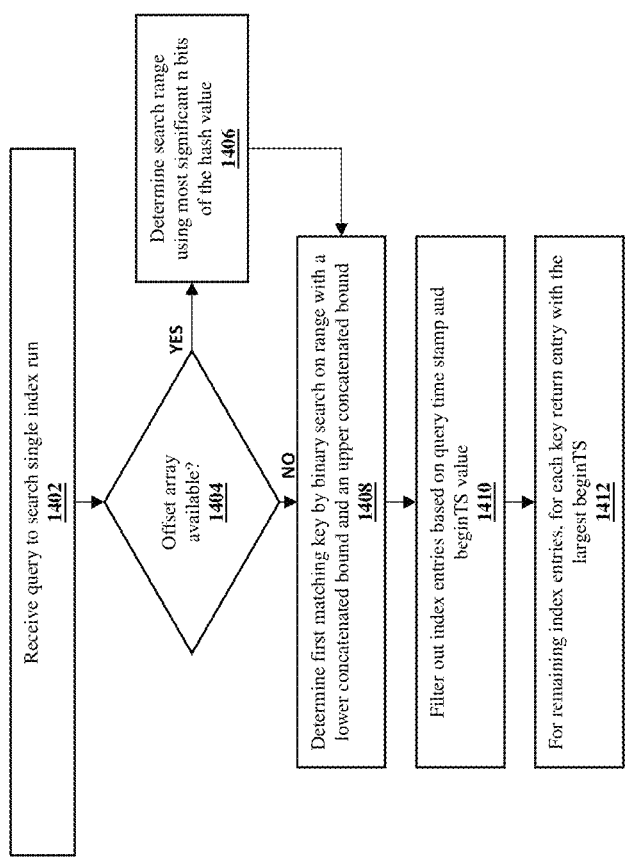
FIG. 17 depicts a flowchart of an example method for performing a range scan query on a single index run according to one or more embodiments of the present invention.

FIG. 17 depicts a flowchart of an example method for performing a range scan query on a single index run according to one or more embodiments of the present invention. Searching a single run returns the most recent version for each matching key in that index run 250 for a received query, at 1402. The first matching key in the single run is first located, at 1408. Because an index run 250 is a table of sorted rows, in one or more embodiments of the present invention, a binary search is used with the concatenated lower bound, i.e., the hash value, equality column values, and the lower bound of sort column values. If the offset array is available, the initial search range can be narrowed down by computing the most significant n bits of the hash value (denoted as i) and taking the i-th and i+1-th value in the offset array, at 1404, 1406.

After the first matching key is determined, index entries are iterated until the concatenated upper bound is reached, i.e., the concatenation of the hash value, equality column values, and the upper bound of sort column values. During the iteration, entries failing timestamp predicate beginTS-≤queryTS are filtered out, at 1410. For the remaining entries, for each key the entry with the largest beginTS is returned, because entries are sorted on the index key and descending order of beginTS, at 1412.

Consider again the example run in FIG. 5, where device is the equality column 212, while msg is the sort column 214. Consider a range scan query with device=4, the bound of msg being [1,3] and queryTS=100. Here, the most significant 3 bits of hash(4)=1001 0001, i.e., 100, are used to obtain the initial search range from the offset array 510, i.e., 2 to 6. In this example, the first matching key is entry 2 after binary search with the input lower bound (1001 0001, 4, 1). The index entries are then iterated starting from entry 2. Entry 2 is returned because it is the most recent version for key (4, 1), while entry 3 is filtered out because it is an older version of entry 2. However, entry 4 is filtered out because its beginTS 102 is beyond the queryTS. The iteration is stopped at entry 5, which is beyond the input upper bound (1001 0001, 4, 3).

Accordingly, the matching entries are efficiently identified for the range scan query using a single run index.

In case of a multiple run index, each run is independently scanned to identify the matching entries as described above. Further, after searching each index run independently, the results that are returned from the multiple runs are reconciled to ensure that only the most recent version is returned for each matching key. For example, two approaches can be used for reconciliation.

In a first, set-based approach, a search is performed from newest index runs 250 to oldest runs sequentially and a set of keys is maintained for the keys that have already been returned to the query. If a key has not been returned before, i.e., not in the set, it is added to the set and the corresponding entry is returned to the query; otherwise, the entry is ignored because it a more recent version from newer runs has already been returned.

Alternatively, in a priority queue approach, multiple index runs are searched together and the results that are returned from each index run 250 are fed into a priority queue to retain a global ordering of keys. Once keys are ordered, the most recent version for each key is selected and the rest are discarded without remembering the intermediate results.

The point lookup query can be viewed as a special case of the range scan query, where the entire primary key is specified such that at most one entry is returned. As a special optimization, the search is performed from newest runs to oldest runs sequentially and stopped early once a match is found. Accordingly, the method used to search the single run (FIG. 17) is used, with the lower bound and upper bound of sort column values being the same.

For large-scale batched point lookups, i.e., as an access path from the secondary index to the primary index, instead of evaluating each point lookup directly, the input keys are first sorted by the hash value 225, equality column values 212, and sort column values 214. Further, each input key is associated with a Boolean value indicating whether this input has been found so far. The sorted input keys are then searched against each index run sequentially from newest to oldest, one run at a time until all the Boolean values are set to true, so that each run block is accessed at most once.

Accordingly, one or more embodiments of the present invention facilitate a hybrid index structure to improve performance of HTAP systems. The hybrid index described herein provides an easy-to-recover/restart distributed log-structured multi-versioned multi-zone index. The parts of the index are easy to move within the storage hierarchy, and still facilitating a quick recovery. According to the structure of the index described herein information is not kept in-memory only; rather, the index levels can either be persisted or non-persisted. If the levels are non-persisted, their contents are recoverable from the last previous persisted level or the committed log.

Further, the hybrid index structure described herein facilitate efficiently returning the right version of the data from a distributed log-structured multi-versioned index. Large-scale hybrid transactional/analytical processing systems organize data differently across multiple zones, typically with more recent data in a data zone that is transaction/insert/update/delete-friendly zone and older data in an analytics/scans-friendly zone. There can even be multiple analytics-friendly zones. In the system, data evolve from one zone to another, as the data age. To look up and return the right version of a key/tuple, a priority queue is used and multiple index runs (from either the same data zone or different data zones) are searched at the same time to retain a global ordering of keys. Once keys are ordered, the most recent version for each key can be selected and the rest can be discarded without having to remember the intermediate results.

It should be noted that although one or more embodiments of the present invention are described with an HTAP system with two zones of data, the features described herein can be used to support other HTAP systems with multi-zone data organization as well. To support multiple zones, instead of two zones as presented herein, the hybrid index is structured with multiple run lists, each of which corresponds to one zone of data. When data evolves from one zone to another, the corresponding index entries are evolved from one run list to another as well through the index evolve operation.

One or more embodiments of the present invention accordingly facilitate a recoverable distributed multi-version multi-zone index that obtains a recoverable index structure utilizing LSM Trees that can be optimized for both, transaction processing and analytics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source-code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
   creating a hybrid index for a multi-zone data storage system comprising a plurality of zones in which a first zone comprises data that is organized for transaction processing, and a second zone comprises data that is organized for analytic processing, each index entry in the hybrid index comprises at least:

an index key that comprises an equality column;
a begin-timestamp column that indicates a timestamp for when the data corresponding to the index entry is inserted;
a tuple-sequence-number column that indicates location of the index entry in an hierarchical storage; and
building an index run to be included in the hybrid index, the index run comprises a plurality of index entries, wherein building the index run comprises:
 determining columns to create in the index run by scanning the data blocks from the first zone, the data blocks to be associated with the index run;
 computing tuple-sequence-number values for the index entries to be included in the hybrid index, the tuple-sequence-number values stored in the tuple-sequence-number column; and
 sorting the index entries according to a predetermined order using the columns to be included in the index run.

2. The computer-implemented method of claim 1, wherein building the index run further comprises:
 creating a header for the index run, the header including a pointer that is set to a present value of an index run pointer; and
 setting value of the index run pointer to point to the header.

3. The computer-implemented method of claim 2, wherein a synopsis of data elements stored within the index run are stored within the header.

4. The computer-implemented method of claim 1, wherein the index entry further includes a hash column and building the index run further comprises:
 computing hash values of the equality column from the index entry, the hash values stored in the hash column.

5. The computer-implemented method of claim 4, wherein building the index run further comprises:
 computing an offset array for the index run, the offset array stored in the header, the offset array maps most significant n bits of the hash values to an offset of the index entry in the index run.

6. The computer-implemented method of claim 1, wherein the index entry further includes a sort column in the index key.

7. The computer-implemented method of claim 1, wherein the index run is assigned a level number, wherein the level number indicates the source of data used to construct the index run.

8. The computer-implemented method of claim 7, wherein the level number further indicates a zone in which the data associated with the index run is stored in, the zone being one from the plurality of zones in the multi-zone data storage system.

9. The computer-implemented method of claim 7, further comprising assigning a separate thread for maintaining one or more index runs from each level.

10. A system comprising:
a storage system comprising a hierarchical data storage; and
one or more processing nodes coupled with the storage system, the one or more processing nodes configured to create and maintain a hybrid index for a multi-zone data storage system comprising a plurality of zones in which a first zone comprises data that is organized for transaction processing, and a second zone comprises data that is organized for analytic processing, each index entry in the hybrid index comprises at least:
an index key that comprises an equality column;
a begin-timestamp column that indicates a timestamp for when the data corresponding to the index entry is inserted;
a tuple-sequence-number column that indicates location of the index entry in an hierarchical storage; and
the one or more processing nodes configured to build an index run to be included in the hybrid index, the index run comprises a plurality of index entries, wherein building the index run comprises:
 determining columns to create in the index run by scanning the data blocks from the first zone, the data blocks to be associated with the index run;
 computing tuple-sequence-number values for the index entries to be included in the hybrid index, the tuple-sequence-number values stored in the tuple-sequence-number column; and
 sorting the index entries according to a predetermined order using the columns to be included in the index run.

11. The system of claim 10, wherein building the index run further comprises:
 creating a header for the index run, the header including a pointer that is set to a present value of an index run pointer; and
 setting value of the index run pointer to point to the header.

12. The computer-implemented method of claim 11, wherein a synopsis of data elements stored within the index run are stored within the header.

13. The system of claim 10, wherein the index entry further includes a hash column and building the index run further comprises:
 computing hash values of the equality column from the index entry, the hash values stored in the hash column; and
 computing an offset array for the index run, the offset array stored in the header, the offset array maps most significant n bits of the hash values to an offset of the index entry in the index run.

14. The system of claim 10, wherein the index run is assigned a level, wherein level number indicates the source of data used to construct the index run, wherein the level number further indicates a zone in which the data associated with the index run is stored in, the zone being one from the plurality of zones in the multi-zone data storage system.

15. A computer program product comprising a computer readable storage medium having program instructions embodied therewith, the program instructions executable by a processing circuit to perform a method for creating and maintaining a hybrid index for a multi-zone data storage system:
wherein, the multi-zone data storage system comprises a plurality of zones in which a first zone comprises data that is organized for transaction processing, and a second zone comprises data that is organized for analytic processing;
wherein, each index entry in the hybrid index comprises at least:
an index key that comprises an equality column;
a begin-timestamp column that indicates a timestamp for when the data corresponding to the index entry is inserted;
a tuple-sequence-number column that indicates location of the index entry in an hierarchical storage; and wherein, the method comprises building an index run to be included in the hybrid index, the index run comprises a plurality of index entries, wherein building the index run comprises:
  determining columns to create in the index run by scanning the data blocks from the first zone, the data blocks to be associated with the index run;
  computing tuple-sequence-number values for the index entries to be included in the hybrid index, the tuple-sequence-number values stored in the tuple-sequence-number column; and
  sorting the index entries according to a predetermined order using the columns to be included in the index run.

16. The computer program product of claim 15, wherein building the index run further comprises:
  creating a header for the index run, the header including a pointer that is set to a present value of an index run pointer; and
  setting value of the index run pointer to point to the header.

17. The computer program product of claim 15, wherein the index entry further includes a hash column and building the index run further comprises:
  computing hash values of the equality column from the index entry, the hash values stored in the hash column, wherein building the index run further comprises:
  computing an offset array for the index run, the offset array stored in the header, the offset array maps most significant n bits of the hash values to an offset of the index entry in the index run.

18. The computer program product of claim 15, wherein the index run is assigned a level, wherein level number indicates the source of data used to construct the index run and, wherein the level number further indicates a zone in which the data associated with the index run is stored in, the zone being one from the plurality of zones in the multi-zone data storage system.

19. A computer-implemented method comprising:
  in response to receipt of a request to merge two index runs, a first index run and a second index run, in a database in which data is stored using a hierarchical data storage:
    creating a third index run to include columns from the first index run and from the second index run;
    sorting, globally, the columns from the first index run and the columns from the second index run using a merge sort;
    based on a determination that the third index run belongs to a non-persisted level, storing the third index run only to a cache storage;
    based on a determination that the third index run belongs to a persisted level, and a level number of the third index run is below a purge level, storing the third index run to the cache storage and to a shared storage; and
    based on a determination that the third index run belongs to a persisted level, and the level number of the third index run is equal to or above the purge level, storing the third index run only to the shared storage.

20. The computer-implemented method of claim 19, further comprising:
  updating a list of index runs in the database, which comprises:
    changing a pointer of a fourth index run that points to an address of the first index run, the pointer changed to an address of the third index run; and
    deleting the first index run and the second index run.

21. The computer-implemented method of claim 20, wherein the first index run and the second index run are deleted after the first index run and the second index run are merged into an index run that belongs to the persisted level.

22. The system of claim 21, wherein each index run is assigned a level, wherein level number indicates the source of data used to construct the index run and, wherein the level number further indicates a zone in which the data associated with the index run is stored in, the zone being one from the plurality of zones in the multi-zone data storage system.

23. A system comprising:
  a storage system comprising a hierarchical data storage; and
  one or more processing nodes coupled with the storage system, the one or more processing nodes configured to:
    create and maintain a hybrid index for a multi-zone data storage system comprising a plurality of zones in which a first zone comprises data that is organized for transaction processing, and a second zone comprises data that is organized for analytic processing, wherein the hybrid index comprises a plurality of index runs, and wherein each index run comprises index entries that are sorted according to a predetermined order using one or more columns to be included in the index run; and
    merge two index runs, a first index run and a second index run by performing a method that comprises:
      creating a third index run to include columns from the first index run and from the second index run;
      sorting, globally, the columns from the first index run and the columns from the second index run using a merge sort;
      based on a determination that the third index run belongs to a non-persisted level, storing the third index run only to a cache storage;
      based on a determination that the third index run belongs to a persisted level, and a level number of the third index run is below a purge level, storing the third index run to the cache storage and to a shared storage; and
      based on a determination that the third index run belongs to a persisted level, and the level number of the third index run is equal to or above the purge level, storing the third index run only to the shared storage.

24. The system of claim 23, wherein the method further comprises:
  updating a list of index runs in the database, which comprises:
    changing a pointer of a fourth index run that points to an address of the first index run, the pointer changed to an address of the third index run; and
    deleting the first index run and the second index run.

25. The system of claim 24, wherein the first index run and the second index run are deleted after the first index run and the second index run are merged into an index run that belongs to the persisted level.

* * * * *